(12) United States Patent
Merrifield et al.

(10) Patent No.: US 8,380,102 B2
(45) Date of Patent: Feb. 19, 2013

(54) TUBULAR SKIVING SEAL FOR A ROTARY TONER METERING MECHANISM

(75) Inventors: David Lee Merrifield, Lexington, KY (US); Royden Thomas Kern, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 398 days.

(21) Appl. No.: 12/790,189

(22) Filed: May 28, 2010

(65) Prior Publication Data

US 2011/0293319 A1    Dec. 1, 2011

(51) Int. Cl.
*G03G 15/08* (2006.01)
(52) U.S. Cl. .......................... 399/106; 399/258; 399/260
(58) Field of Classification Search .................. 399/106, 399/105, 103, 258, 260; 222/DIG. 1
See application file for complete search history.

(56) References Cited

U.S. PATENT DOCUMENTS

| | | | |
|---|---|---|---|
| 4,277,003 A * | 7/1981 | Tabuchi et al. | 222/DIG. 1 X |
| 4,347,299 A * | 8/1982 | Ozawa et al. | 430/122.8 |
| 4,742,797 A | 5/1988 | Barker | |
| 4,876,575 A | 10/1989 | Hays | |
| 5,080,745 A | 1/1992 | Paull | |
| 6,510,291 B2 | 1/2003 | Campbell | |
| 7,590,373 B2 | 9/2009 | Hebner | |
| 8,150,297 B2 * | 4/2012 | Gayne et al. | 399/260 |
| 2004/0228660 A1 * | 11/2004 | Iikura et al. | 399/260 |
| 2005/0015987 A1 | 1/2005 | Berg | |
| 2005/0254861 A1 * | 11/2005 | Schlageter et al. | 399/258 |
| 2007/0041751 A1 | 2/2007 | Baker | |
| 2007/0104505 A1 * | 5/2007 | Murakami et al. | 399/106 |

OTHER PUBLICATIONS

International Search Report and Written Opinion of the International Searching Authority dated Sep. 15, 2011 for PCT Application No. PCT/US2011/038365.

* cited by examiner

*Primary Examiner* — Sophia S Chen
(74) *Attorney, Agent, or Firm* — John Victor Pezdek; Justin M Tromp

(57) ABSTRACT

A toner container system includes a reservoir for containing toner having a rotatable member positioned within an opening through the reservoir and a skiving seal for blocking toner from entering a gap between the opening and the rotatable member. The skiving seal is positioned along the length of the rotatable member and is adhesively affixed adjacent to the rotatable member along the gap in the skiving direction of rotation of the rotatable member. The skiving seal includes a flexible sheet having a length corresponding to the length of the gap and a tubular portion adjacent to the gap formed by folding the flexible sheet over itself from an edge extending along the length of the flexible sheet, without creasing the fold, and adhering a portion of the folded portion of the flexible sheet to the surface of the flexible sheet along the length of the flexible sheet.

18 Claims, 3 Drawing Sheets

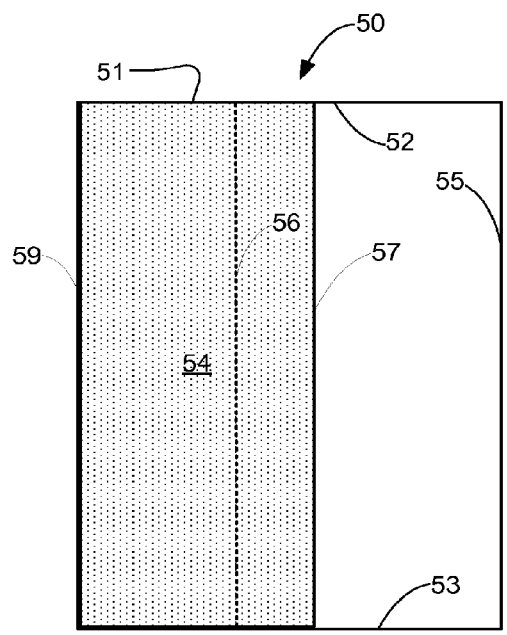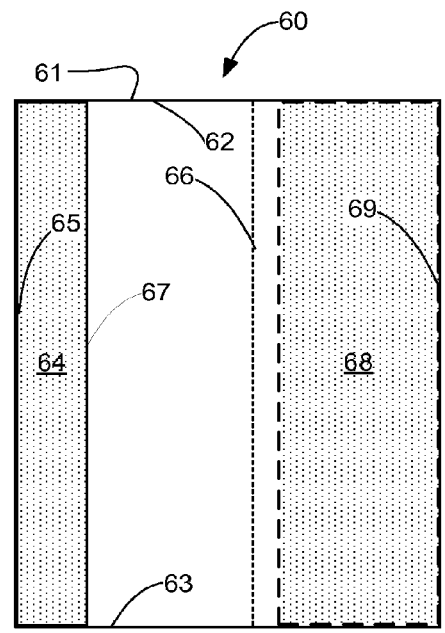
FIG. 3   FIG. 4
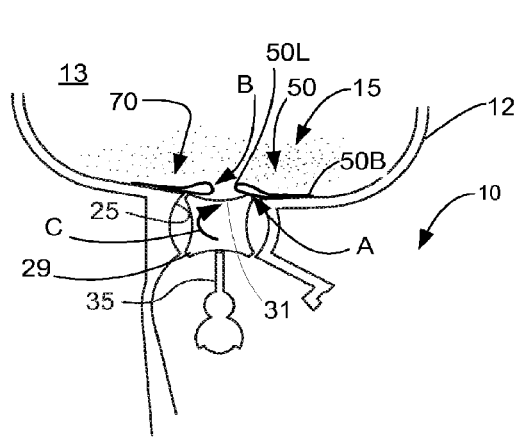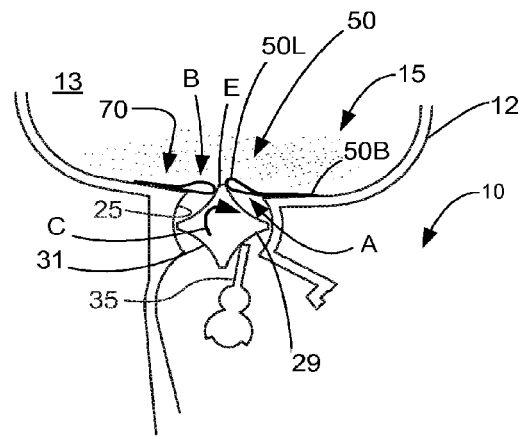
FIG. 5a   FIG. 5b

TUBULAR SKIVING SEAL FOR A ROTARY TONER METERING MECHANISM

CROSS REFERENCES TO RELATED APPLICATIONS

This patent application is related to the U.S. patent application Ser. No. 12/424,905, filed Apr. 16, 2009, entitled "Rotating Toner Cleaning Member For A Toner Delivery Device In An Image Forming Apparatus" and U.S. patent application Ser. No. 12/424,921, filed Apr. 16, 2009, entitled "Geneva Drive And Locking Mechanism Therefore In A Toner Metering Mechanism For An Image Forming Apparatus", both assigned to the assignee of the present invention.

BACKGROUND OF THE INVENTION

1. Field of the Invention

The present invention relates to image forming devices and to toner container structures therefore having a rotating toner transfer mechanism for transferring toner from a first region to a second region of the container structure, and more particularly to a tubular sealing member for the rotating toner transfer mechanism in a skiving direction.

2. Description of the Related Art

Image forming devices including copiers, laser printers, facsimile machines, and the like, include a photoconductive drum having a rigid cylindrical surface that is coated along a defined length of its outer surface. The surface of the drum is charged to a uniform electrical potential and is selectively exposed to light in a pattern corresponding to an original image. The areas of the drum surface exposed to light are discharged and form a latent electrostatic image on the drum surface. Developer material, such as toner having an electrical charge, is attracted to the drum surface and is used for forming the toned image.

The toner is typically contained in a structure such as a cartridge adjacent to the photoconductive drum for supplying the image forming material to a developer roller and to the photoconductive drum for forming a toned image on discharged portions of the photoconductive drum. A recording sheet, such as a blank sheet of paper, is then brought adjacent to the discharged photoconductive drum surface and the image forming material (toner) thereon is transferred to the recording sheet. The image forming material is then fused to the sheet using pressure and/or heat. The toner is typically transferred to the developer roller from a working reservoir within the cartridge. A toner transfer mechanism transfers amounts of toner from a storage reservoir to the working reservoir when the system calls for additional toner.

Additional background information on the structure and operation of image forming devices and toner container structures and toner supply mechanisms disposed within image forming devices generally may be found in U.S. Pat. No. 6,510,291 to Campbell et al., and in U.S. Patent Publication No. 2008/0219709 by Hebner et al.

Toner container structures typically include a toner transfer mechanism having a rotatable toner transfer member that is cleared of toner by a rotatable member. In order to prevent unwanted leakage of toner from the toner storage reservoir to the toner working reservoir because of gaps in the toner transfer mechanism and its support structure, a reliable cost effective seal is needed and, in particular, a sealing member that is effective in a skiving direction of rotation of the toner transfer member is needed.

In electrophotographic or laser printers, there are frequently rotating components that are immersed in toner and must be properly sealed to prevent toner leakage into printers, leaking onto customers, or simply to contain toner in the area it needs to stay. Sealing the sides along the longitudinal axis of these rotating members usually involves thin flexible materials that are cantilevered from a base and lightly pressed against the rotating member. This works well in cases where the rotating surface of the member drags or pulls along the surface of the seal from its base where it is attached to its tip or free end. This is called the dragging direction. These thin seals do not work as well when the rotation is in the opposite direction, pushing from tip to base of the seal. This is called the skiving direction. In this case, varying friction between the seal and the rotating member or the positioning of the seal may cause the rotating member to catch or grab the edge of the seal causing the seal to buckle and flip under, thereby destroying the sealing action and releasing toner. It is often difficult, as printers get smaller and smaller, to architect the toner-containing bodies so that all flexible seals work in the dragging direction. It is desirable to have some seals work in the skiving direction.

SUMMARY OF THE INVENTION

According to an exemplary embodiment, a toner container system for an image forming apparatus includes a reservoir for containing toner having an opening therethrough in communication with an interior of the reservoir, a rotatable member positioned within the opening and a skiving seal for blocking toner from entering a gap between the opening and the rotatable member. The skiving seal is positioned along the length of the rotatable member and is adhesively affixed adjacent to the rotatable member along the gap in the skiving direction of rotation of the rotatable member. The skiving seal includes a flexible sheet having a surface and a length corresponding to the length of the gap. The skiving seal further includes a tubular portion adjacent to the gap formed by folding the flexible sheet over itself from an edge extending along the length of the flexible sheet, without creasing the fold, and adhering a portion of the folded portion of the flexible sheet to the surface of the flexible sheet along the length of the flexible sheet.

Some embodiments include a second reservoir for receiving toner from the first reservoir via an opening interconnecting the first reservoir and the second reservoir. A toner transfer meter roller is rotatably positioned within the opening for transferring toner from the first reservoir to the second reservoir. In such embodiments, the skiving seal is adhesively positioned within the first reservoir along the opening in the skiving direction of rotation of the toner transfer meter roller for sealing a gap between the opening and the length of the toner transfer meter roller.

In some embodiments, the skiving seal includes an adhesive-coated area on a first side of the flexible sheet and the tubular portion is formed by folding the first side of the flexible sheet over itself from the edge extending along the length of the flexible sheet and adhesively adhering the edge of the first side of the flexible sheet within the adhesive-coated area. The seal is adhered to a surface of the reservoir adjacent to the gap by a remaining portion of the adhesive-coated area.

Alternatives include those wherein the skiving seal includes a first adhesive-coated area at the edge of a first side of the flexible sheet and a second adhesive-coated area on a second side of the sheet. The tubular portion is formed by folding the first side of the flexible sheet over itself from the edge extending along the length of the flexible sheet and adhesively adhering the first adhesive-coated area to a surface of the first side of the flexible sheet. The seal is adhered to a surface of the reservoir adjacent to the gap by the second adhesive-coated area.

Embodiments include those wherein the cross section of the tubular portion is circular, elliptical or tear drop shaped. In some embodiments, the cross-sectional width of the tubular portion is greater than the width of the gap. Embodiments include those wherein the seal has a moment of inertia sufficient to prevent buckling of the tubular portion so that the tubular portion is not carried into the gap by the rotatable member as the rotatable member rotates past the seal in the skiving direction of rotation.

BRIEF DESCRIPTION OF THE DRAWINGS

Figure 1:
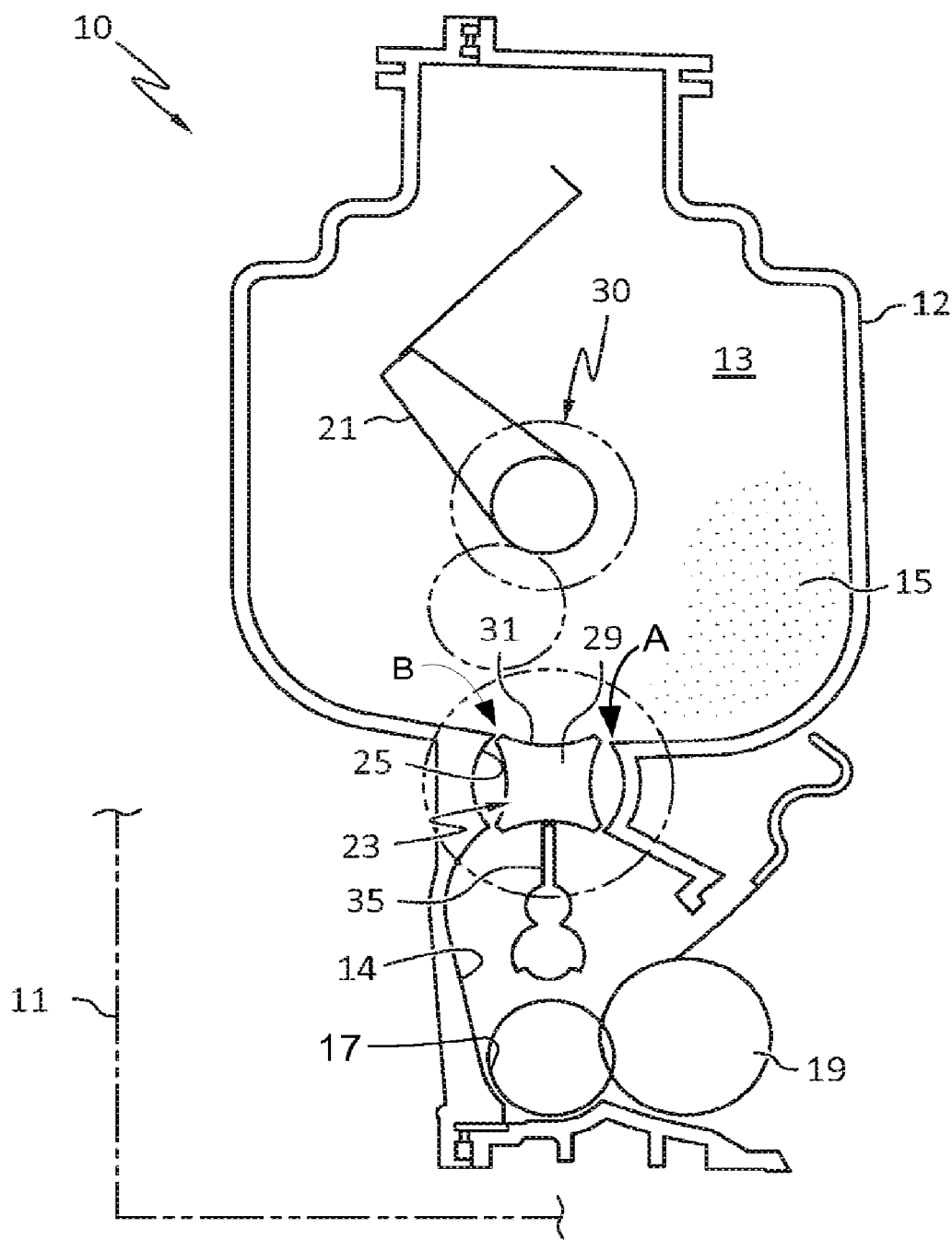
Figure 2:
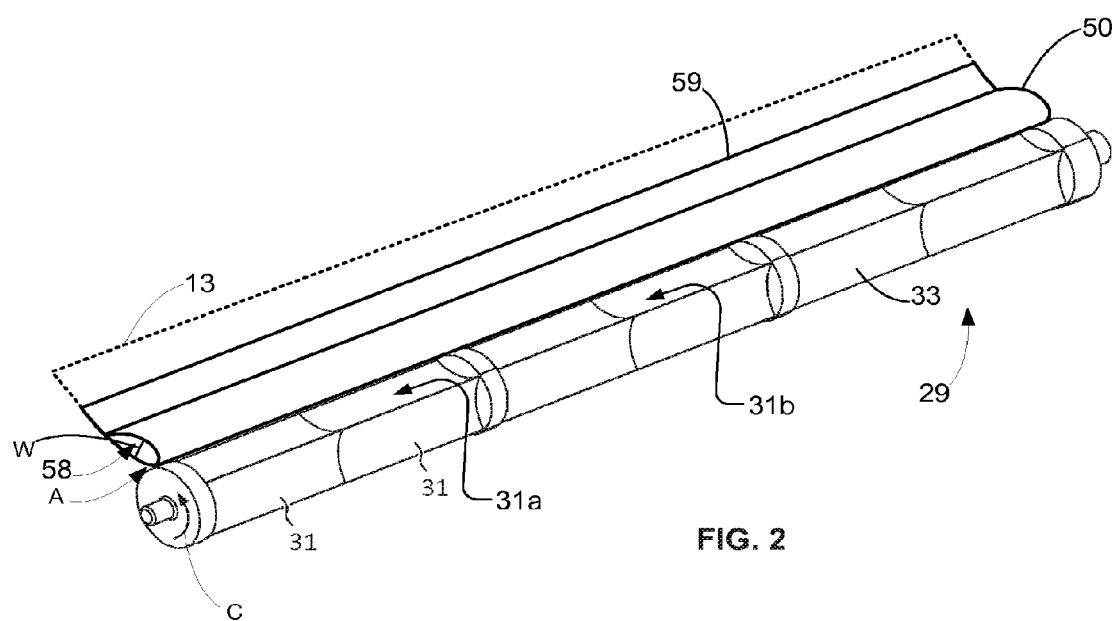

Having thus described the invention in general terms, reference is now made to the accompanying drawing figures that are not necessarily drawn to scale, and wherein:

FIG. 1 shows a sectional view of a toner container system as disposed within and forming a part of an image forming apparatus and to which the present invention may be effectively applied;

FIG. 2 is a perspective view of a toner transfer meter roller that may be included in the structure of FIG. 1 including plural concave recessed regions in the roller surface, and a skiving seal having a tubular portion extending along the length of the toner meter roller;

FIG. 3 is a plan view of a first embodiment of the skiving seal prior to being formed;

FIG. 4 is a plan view of an alternative embodiment of the skiving seal prior to being formed; and FIGS. 5a and 5b each show a partial sectional view of a toner container system of FIG. 1 showing the cooperation of the skiving seal with the toner transfer meter roller as it is rotated.

DETAILED DESCRIPTION

The present invention will now be described more fully hereinafter with reference to the accompanying drawing figures, in which some, but not all embodiments of the invention are shown. The invention may be embodied in many different forms and should not be construed as limited to the embodiments set forth herein; rather, these embodiments are provided so that this disclosure will satisfy applicable legal requirements.

The basic elements and operation of the overall electrophotographic image forming process in a typical image forming apparatus utilizing a plurality of color cartridges containing toner are well known. In operation, a quantity of image forming material (toner) is conveyed between selected regions of the cartridge and elsewhere in the printer using various conveying mechanisms and rollers each requiring seals to prevent toner leakage.

Referring now to FIG. 1, shown therein is a sectional view of an exemplary toner container 10 system, such as a toner cartridge, to which the present invention may be applied, as disposed within and forming a part of an image forming apparatus 11. Toner container 10 generally comprises a housing 12 defining therewithin two reservoirs, namely first upper (storage) reservoir 13 and second lower (working) reservoir 14 for supplying image forming material, such as toner 15, to a toner adder roller 17, which in turn supplies toner to an image developer roller mechanism 19 which then supplies toner to a photoconductive drum (not shown) within image forming apparatus 11. Upper reservoir 13 may include paddles or agitators, represented in FIG. 1 by paddle 21, for agitating toner 15 in upper reservoir 13 to facilitate transfer of toner to lower reservoir 14. Paddle 21 may be sized to extend substantially the length of toner container 10 and to rotate closely to the walls of upper reservoir 13 so as to agitate and prevent clumping of toner 15. Paddle 21 may otherwise be configured for the intended purpose as would occur to the skilled artisan.

Toner container 10 may be structured to contain black toner for a black only image forming apparatus (such as a printer). Toner container 10 may also comprise one of a plurality of similarly structured toner containers, such as the various toner cartridges included in a color image forming apparatus, all of which are generally of similar construction but distinguished by the toner color contained therein. A typical color image forming apparatus may include individual cartridges including respective toner colors of black, magenta, cyan, and yellow, each respective color forming an individual image of a single color that is combined in layered fashion with the other colors to create the final multi-colored image. Toner container 10 (and each of the other toner containers included in the image forming apparatus) may include an image developer roller mechanism 19 that operatively contacts the photoconductive drum within an image forming apparatus 11.

In the toner container 10 system, movement of toner 15 from upper reservoir 13 to lower reservoir 14 may be facilitated using a geared toner supply mechanism having any suitable structure as would occur to the skilled artisan practicing the invention such as represented in dashed lines as toner transfer mechanism 30, along with attached paddle 21 within upper reservoir 13 for agitating and moving toner 15 into toner transfer mechanism 23. As would also occur to a skilled artisan, housing 12 may be split into two housings detachably mounted together, each containing a toner reservoir, one of the toner reservoirs containing the toner transfer mechanism 23. Alternatively, both reservoirs could be detachably mounted to the toner transfer mechanism.

A toner transfer meter roller mechanism 23 is disposed within an intermediate region 25 between upper reservoir 13 and lower reservoir 14. Gaps A and B shown in an exaggerated manner for illustrative purposes occur between intermediate region 25 of housing 12 and toner transfer meter roller 29. Roller mechanism 23 is configured to supply toner 15 from upper reservoir 13 to lower reservoir 14 when the system calls for toner, as through a toner level sensing device disposed within reservoir 14. The toner sensing device may be of any conventional type known in the applicable art as would be selected by one skilled in the art for inclusion in the overall container 10 structure. Roller mechanism 23 includes a toner transfer meter roller 29 shown separately in the perspective view (not to scale) in FIG. 2. Toner transfer meter roller 29 is structured so as to facilitate the transfer of measured amounts of toner 15 from upper reservoir 13 to lower reservoir 14.

With reference to FIG. 2 in conjunction with FIG. 1, it is seen that toner transfer meter roller 29 typically is generally cylindrical in shape, about 10 to about 30 mm in diameter (i.e., a radius of curvature of about 5 to 15 mm). Toner transfer meter roller 29 includes one or more axially and circumferentially spaced concave recesses 31 defined in the cylindrical surface thereof by concave surfaces 33 in the general shape of a pocket defining a cylindrical section. Concave surfaces 33 may preferably be defined by a radius of curvature. The radius of curvature of concave surfaces 33 may be about 0.75 to 3.0 times the radius of curvature of toner transfer meter roller 29. Selection of the curvature of toner transfer meter roller 29 relative to the curvature of convex surfaces 33 may be made by one skilled in the applicable art practicing the invention, the specific selection not considered limiting of the invention or of the appended claims.

Recesses 31 typically are defined in one or more sets such as shown as sets 31a, 31b. The sets 31a, 31b are typically aligned axially along the surface of toner transfer meter roller 29, with each set 31a, 31b including a selected plurality of circumferentially and equally spaced recesses 31 around the circumferential surface of toner transfer meter roller 29 and defining the cruciform-like cross section, such as shown in FIG. 1, including a plurality of four recesses in each set. Accordingly, upon rotation of toner transfer meter roller 29, each recess 31 is positioned alternately at a first position open to upper reservoir 13 where it is filled with toner 15 with rotation of paddle 21 assisting in the movement of toner 15 into recesses 31 and at a second position open to lower reservoir 14 where the toner 15 is removed from recesses 31. Substantially complete removal of toner from recesses 31 and the transfer of consistent amounts of toner with each rotation of toner transfer meter roller 29 are accomplished using a rotatable wiper member 35 within lower reservoir 14. Toner transfer meter roller 29 is structured and operated to rotate past rotatable member 35 intermittently as rotatable member 35 rotates in order to remove toner from the toner bearing recesses 31, as each recess 31 is alternately open to lower reservoir 14. In the operation of container 10, rotatable member 35 may be structured and operated to be continually rotating.

In order for toner transfer meter roller 29 to rotate past rotatable member 35 so as to clear toner from recesses 31, toner transfer meter roller 29 must be held in position momentarily such as depicted in FIG. 1. The gap between the distal end of member 35 and the surfaces 33 of recesses 31 should be kept to a minimum to maximize the amount of the volume of recesses 31 swept by rotatable member 35 and to avoid substantial physical contact between rotatable member 35 and toner transfer meter roller 29. Rotatable member 35 may include a flexible distal end so as to preclude interference with or damage to surfaces 33. The process of removing toner from the toner bearing recesses 31 of toner transfer meter roller 29 may be particularly desirable if toner 15 has poor flow properties so as to accumulate on the surfaces 33 of recesses 31. Such accumulation could result in inconsistent toner delivery and a consequent inaccurate gauging of overall toner consumption.

A drive mechanism, such as a Geneva drive mechanism, is in operative engagement with toner transfer meter roller 29 in order to rotate toner transfer meter roller 29 through selected angular increments in order to supply toner 15 through toner transfer mechanism 23 (FIG. 1), such as upon a command for toner by the toner sensing device. Operation of the Geneva drive mechanism is detailed in the aforementioned U.S. patent application Ser. No. 12/424,921 and includes a drive wheel which may form a part of geared toner transfer mechanism 30 within toner container 10. The drive wheel includes, near the periphery thereof, a pin for engaging slots of a driven wheel of the drive mechanism. The driven wheel is attached to roller member 29 for rotation therewith. For toner transfer meter roller 29, the driven wheel includes four slots equally spaced around the circumference of the driven wheel. The number of slots corresponds to the number of recesses 31 disposed around the circumference of toner transfer meter roller 29 so that each incremental angular advance of the driven wheel rotates toner transfer meter roller 29 an identical incremental angular displacement. As suggested below, the driven wheel may comprise any of various pluralities of slots, and toner transfer meter roller 29 will include a corresponding number of recesses in each set 31a, 31b.

The Geneva drive may comprise other pluralities of slots circumferentially defined around the driven wheel, including 3, 5, 6 or more slots, as a particular application would require. For example, for a driven wheel containing three slots, each rotation of the drive wheel advances toner transfer meter roller 29 through 120 degrees, and for a driven wheel containing five slots, each rotation of the drive wheel advances toner transfer meter roller 29 through 72 degrees, and for a driven wheel containing six slots, each rotation of the drive wheel advances toner transfer meter roller 29 through 60 degrees. The number and spacing of recesses 31 disposed in sets 31a, 31b around the circumference and along the length of toner transfer meter roller 29 would be selected to correspond to the selected number of slots in the driven wheel.

In operation of the Geneva drive mechanism for incremental rotation of toner transfer meter roller 29, actuation of toner transfer meter roller 29 must be timed with rotatable member 35 so that the two components will not collide. If toner transfer meter roller 29 and rotatable member 35 are rotating as a gear train relative to each other, rotatable member 35 will not properly sweep recesses 31 of toner transfer meter roller 29. If both components are rotating in the same direction, the rotatable member 35 will collide with toner transfer meter roller 29. A locking mechanism is provided to prevent actuation of toner transfer meter roller 29 to a position where toner transfer meter roller 29 and rotatable member 35 collide or interfere. Accordingly, the collisions between toner transfer meter roller 29 and rotatable member 35 is obviated by a locking mechanism that locks geared toner transfer mechanism 30 and Geneva drive mechanism in an operating position when toner transfer meter roller 29 is not actuated. Toner transfer meter roller 29 may then be actuated intermittently when it is in a position at which it will not interfere with rotatable member 35.

The locking mechanism should remain in the unlocked position when the drive gear for paddle 21 (FIG. 1) is rotating. Other cam driven structures as well as other locking mechanisms that would perform the function as would occur to the skilled artisan in consideration of and guided by these teachings are considered within the scope of these teachings and the appended claims. So if rotatable member 35 is not present then the need for the locking mechanism is obviated.

Referring again to FIG. 1, gaps A and B are indicated between toner transfer meter roller 29 and intermediate region 25 of the housing 12 through which toner 15 may leak from upper reservoir 13 to lower reservoir 14. FIG. 2 illustrates one embodiment of the skiving seal 50 mounted on an inner surface of reservoir 13 (shown in dashed lines) adjacent to the skiving direction of rotation as indicated by arrow C on toner transfer meter roller 29.

Referring to FIGS. 2 and 3, skiving seal 50, in one form, is constructed of a generally rectangular flexible sheet 51 with an adhesive-coated area 54 on one side of sheet 51 extending between the top edge 52 and bottom edge 53 and long edge 59 and long edge 57. The length of sheet 51 is sized to extend over the length of the gap A between housing 12 and the toner transfer meter roller 29. Sheet 51 is folded over from long edge 55 without creasing the fold. Long edge 55 is aligned along mating line 56 in the adhesive-coated area 54 and pressed into the adhesive, sealing the surfaces between mating line 56 and long edge 57 of the adhesive-coated area 54 and forming a tubular portion 58 along the length of sheet 51 on what will be the leading edge of skiving seal 50 when installed. The skiving seal 50 is flipped over and adhered to the interior surface of the upper reservoir 13 adjacent gap A along the length of toner transfer meter roller 29 using a remaining portion of the adhesive-coated area 54 that extends to long edge 59.

Folding of sheet 51 in the manner described forms a large-radius tubular portion 58 along the length of the leading edge of skiving seal 50. Tubular portion 58 may be circular, elliptical or tear dropped in cross section. As the position of mating line 56 moves toward long edge 59, the radius of tubular portion 58 that is formed decreases becoming more rounded or circular in cross section. Conversely, as mating line 56 moves toward long edge 57 of the adhesive-coated area 54, the radius of tubular portion 58 increases becoming more elongated in cross section.

When the rotating toner transfer meter roller 29 tries to grab skiving seal 50 in the skiving direction due to friction, the moment of inertia of tubular portion 58 prevents buckling of tubular portion 58 and prevents it from being carried into gap A that would lead to seal failure. Skiving seal 50 also has large allowance for positioning along gap A, since the rounded leading edge of skiving seal 50 is not a sharp edge to be caught by the rotating toner transfer meter roller 29 and flipped under. In some embodiments, the width W of the cross-section of the tubular portion 58 (shown in FIG. 2) is greater than the width of gap A so as to prevent skiving seal 50 from being drawn into gap A by the rotation of toner transfer meter roller 29. Exact positioning of skiving seal 50 is a matter of design choice as one skilled in the art would recognize. Also, since the tube shape has a high moment of inertia, skiving seal 50 has the rigidity to span across and partial cover recesses 31 in toner transfer meter roller 29 while still allowing for toner 15 to flow into the recesses 31 as they are rotated into the upper reservoir 13. This also allows skiving seal 50 to act as a leveling device for the toner contained within recesses 31 as toner transfer meter roller is rotated past it. Further, the flexibility of sheet 51 allows operation of skiving seal 50 adjacent to a rotatable member that contains a projection without disrupting the rotation of the rotatable member.

FIG. 4 shows an alternative construction for a skiving seal. Similar numbers have been used to refer to elements similar to those shown for skiving seal 50. Skiving seal 60 is constructed of a flexible sheet 61 with an adhesive-coated area 64 extending between top and bottom edges 62, 63 along the long edge 65 on one side of sheet 61 and another adhesive-coated area 68 extending along the long edge 69 on the opposite side of sheet 61. Sheet 61 is folded over from long edge 65 without creasing the fold. Long edge 65 is aligned along mating line 66 and pressed into the surface of sheet 61 sealing the surfaces between mating line 66 and long edge 67 of the adhesive-coated area 64 and forming a tube having a shape as previously described on what will be the leading edge of skiving seal 60 when installed. The skiving seal 60 adheres to the interior surface of the upper reservoir 13 adjacent gap A along the length of toner transfer meter roller 29 using the adhesive-coated area 68 that extends from the top and bottom edges 62, 63 to long edge 69. The present embodiment is such that the mating line 66 is coincident with long edge 69.

Other ways of folding sheet 51, 61 to form the tubular leading edge may be made by one skilled in the applicable art practicing the invention, the specific manner of folding not considered limiting of the invention or of the appended claims. Further the tubular edge may be formed from a separate sheet and then attached to a second flat sheet to form skiving seal 50, 60. The material composition of each sheet may be the same or different. The exact dimensions of the adhesive-coated areas 54, 64, 66 are a matter of design choice. Further the adhesive-coated areas 54, 64, 66 not need be continuous as shown and may be in the form of a plurality of smaller adhesive-coated areas. In either embodiment the ends of tubular portion formed in sheet 51, 61 can be left open or can be sealed.

Adhesives such as FASTAPE™ 7306 sold by Avery Dennison Corporation located in Pasadena, Calif. USA may be used as contemplated above for forming the tube or tubular portion and securing the skiving seal 50, 60 to the housing 12. Of course, other forms of securing the skiving seal 50, 60 to housing 12 may be used such as screws or rivets or used in combination with adhesives. However, use of adhesive is preferred.

Sheet 51, 61 may comprise a polymeric material, such as a thermoplastic or thermoset type material, such as extrusions of the thermoplastic polyester, such as a translucent polyester film, for example MYLAR™ sold by DuPont located in Wilmington, Del. USA, in thicknesses from about 0.001 to about 0.020 inch, or other thermoplastics including polyesters, polyvinyl chloride, or thermoplastic elastomers, including polyurethane or polyester type elastomers. In some embodiments, the thickness of sheet 51, 61 is in the range of 0.05 mm to 0.20 mm. It is understood, however, that the specific selected sizes, structure and composition of skiving seal 50, 60 are not intended to be limited to the exemplary embodiments specifically described herein. Sheet 51, 61 should be thick enough to provide wear resistance and sufficient moment of inertia to prevent the tube from collapsing when in contact with toner transfer meter roller 29 as it rotates in the skiving direction. In one form, sheet 51, 61 may have a low coefficient of friction so as to minimize friction with the toner 15 contained in recesses 31 and the surface of toner transfer meter roller 29. Further, the thinness of skiving seal 50, 60 where it adheres to reservoir 13 minimizes areas within reservoir 13 where toner may collect and not be fed to reservoir 14 and minimizes interference with paddle 21 as it rotates within reservoir 13.

In an exemplary embodiment sheet 51 is 29 mm wide and 221.5 mm long and sheet 61 is 39 mm wide and 221.5 mm long. It being noted that the length approximately corresponds to the length of toner transfer meter roller 29. The adhesive-coated area 54 is about 14 mm wide and 221.5 mm long. Adhesive-coated area 64 is about 10 mm wide and 221.5 mm long and adhesive-coated area 68 is about 14 mm wide and 221.5 mm long. It is understood, however, that the specific selected sizes, structure and composition of skiving seal 50, 60 are not intended to be limited to the exemplary embodiments specifically described herein.

Referring now to FIGS. 5a and 5b, another aspect of the skiving seal 50 is shown wherein skiving seal 50 is provided on the skiving direction of rotation at gap A and flap seal 70 is provided in the dragging direction of rotation of toner transfer meter roller 29 at gap B. Arrow C indicates the rotational direction of toner transfer meter roller 29 and, as shown, skiving seal 50 is in the skiving direction of toner transfer meter roller 29. In FIG. 5a, toner transfer meter roller 29 is positioned such that toner 15 can enter into recess 31 on the upper portion of toner transfer meter roller 29. Skiving seal 50 seals gap A while flap seal 70 seals gap B along the opposite edges of toner transfer meter roller 29. In FIG. 5b, toner transfer meter roller 29 has rotated with the common edge E between adjacent recesses 31 moving against skiving seal 50 in the skiving direction. As edge E encounters the leading edge 50L of skiving seal 50, tubular portion 58 allows skiving seal 50 to be deflected upward allowing the edge E of toner transfer meter roller 29 to pass beneath as it moves toward the skiving seal base 50B which is adhesively affixed to housing 12 in the upper reservoir 13.

Flap seal 70 encounters edge E of toner transfer meter roller 29 in the dragging direction and is deflected upward while still maintaining a seal with the surface of toner transfer meter roller 29.

It is noted further that each toner container in an image forming apparatus having multiple toner containers (cartridges) each containing a respective toner color may be structured substantially as described above for container 10. Further, toner transfer mechanism 23 and lower reservoir 14 can be structured as elements of the image forming apparatus 11 itself. In this arrangement, reservoir 13 containing the original charge of toner 15 may be insertable into apparatus 11 as a separate unit and operatively engage toner transfer mechanism 23 in a substantially similar manner to that depicted in the accompanying drawing figures.

While the exemplary embodiments described herein discuss a skiving seal 50, 60 adhesively positioned in a toner container 10 having an upper reservoir 13, a lower reservoir 14 and a toner transfer meter roller 29 for transferring toner therebetween, skiving seal 50, 60 may be used to seal a rotatable member in any application where it is desirable to prevent toner from migrating from one side of the rotatable member to another.

The invention therefore provides a toner container system, such as a toner cartridge having two reservoirs for holding toner having an opening therebetween through which toner passes from one reservoir to the other, a toner transfer meter roller rotatably positioned within the opening a using selective incremental angular advancement of the toner transfer meter roller for transferring the toner between the reservoirs, and a skiving seal adhesively positioned within the one reservoir for sealing a gap between the opening and the length of the toner transfer meter roller along the opening in the skiving direction of rotation of the toner transfer meter roller, the skiving seal comprising a sheet having an adhesive-coated area and a tubular portion formed by folding the sheet over itself along one edge and adhesively adhering a portion of the folded sheet to the surface of the sheet within a portion the adhesive-coated area with a remaining portion of the adhesive-coated area affixing the skiving seal so formed to a surface of one reservoir adjacent the gap.

It is understood that the invention may be practiced in ways other than as specifically set forth herein without departing from the scope and essential characteristics of the invention. The description of several embodiments of the invention as herein presented is therefore intended for purposes of illustration. It is not intended to be exhaustive or to limit the invention to the precise forms disclosed, and obviously many modifications and variations are possible in light of the above teachings. It is intended that the scope of the invention be defined by the claims appended hereto.

What is claimed is:

1. A toner container system for an image forming apparatus comprising:
    a reservoir for containing toner having an opening therethrough in communication with an interior of the reservoir;
    a rotatable member positioned within the opening; and
    a skiving seal for blocking toner from entering a gap between the opening and the rotatable member, the skiving seal positioned along the length of the rotatable member and adhesively affixed adjacent to the rotatable member along the gap in the skiving direction of rotation of the rotatable member, the skiving seal comprising:
       a flexible sheet having a surface and a length corresponding to the length of the gap; and
       a tubular portion adjacent to the gap formed by folding the flexible sheet over itself from an edge extending along the length of the flexible sheet without creasing the fold and adhesively adhering a portion of the folded portion of the flexible sheet to the surface of the flexible sheet along the length of the flexible sheet.

2. The toner container system for an image forming apparatus of claim 1, wherein the skiving seal further comprises an adhesive-coated area on a first side of the flexible sheet, the tubular portion being formed by folding the first side of the flexible sheet over itself from the edge extending along the length of the flexible sheet and adhesively adhering the edge of the first side of the flexible sheet within the adhesive-coated area.

3. The toner container system for an image forming apparatus of claim 2, wherein the skiving seal is adhered to a surface of the reservoir adjacent to the gap by a remaining portion of the adhesive-coated area.

4. The toner container system for an image forming apparatus of claim 1, wherein the skiving seal further comprises a first adhesive-coated area at the edge of a first side of the flexible sheet, the tubular portion being formed by folding the first side of the flexible sheet over itself from the edge extending along the length of the flexible sheet and adhesively adhering the first adhesive-coated area to a surface of the first side of the flexible sheet.

5. The toner container system for an image forming apparatus of claim 4, wherein the skiving seal further comprises a second adhesive-coated area on a second side of the flexible sheet and the skiving seal is adhered to a surface of the reservoir adjacent to the gap by the second adhesive-coated area.

6. The toner container system for an image forming apparatus of claim 1, wherein the tubular portion has a cross section selected from the group consisting of circular, elliptical and tear drop shaped.

7. The toner container system for an image forming apparatus of claim 1, wherein the skiving seal has a moment of inertia sufficient to prevent buckling of the tubular portion so that the tubular portion is not carried into the gap by the rotatable member as the rotatable member rotates past the skiving seal.

8. The toner container system for an image forming apparatus of claim 1, wherein a cross-sectional width of the tubular portion is greater than a width of the gap.

9. A toner container system for an image forming apparatus comprising:
    a first reservoir for containing toner;
    a second reservoir for receiving toner from the first reservoir via an opening interconnecting the first reservoir and the second reservoir;
    a toner transfer meter roller rotatably positioned within the opening for transferring toner from the first reservoir to the second reservoir; and
    a skiving seal adhesively positioned within the first reservoir along the opening in the skiving direction of rotation of the toner transfer meter roller for sealing a gap between the opening and the length of the toner transfer meter roller, the skiving seal comprising:
       a flexible sheet having an adhesive-coated area on a first side of the flexible sheet and a length corresponding to the length of the gap; and
       a tubular portion adjacent to the gap formed by folding the first side of the flexible sheet over itself from the edge extending along the length of the flexible sheet without creasing the fold and adhesively adhering the edge of the first side of the flexible sheet within the adhesive-coated area, the skiving seal being adhered to a surface of the first reservoir adjacent to the gap by a remaining portion of the adhesive-coated area.

10. The toner container system for an image forming apparatus of claim 9, wherein the tubular portion has a cross section selected from the group consisting of circular, elliptical and tear drop shaped.

11. The toner container system for an image forming apparatus of claim 9, wherein the skiving seal has a moment of inertia sufficient to prevent buckling of the tubular portion so that the tubular portion is not carried into the gap by the toner transfer meter roller as the toner transfer meter roller rotates past the skiving seal.

12. The toner container system for an image forming apparatus of claim 9, wherein the toner transfer meter roller includes at least one recess for transferring toner and the skiving seal levels toner within the at least one recess as the toner transfer meter roller rotates past the skiving seal.

13. The toner container system for an image forming apparatus of claim 9, wherein a cross-sectional width of the tubular portion is greater than a width of the gap.

14. A toner container system for an image forming apparatus comprising:
   a first reservoir for containing toner;
   a second reservoir for receiving toner from the first reservoir via an opening interconnecting the first reservoir and the second reservoir;
   a toner transfer meter roller rotatably positioned within the opening for transferring toner from the first reservoir to the second reservoir; and
   a skiving seal adhesively positioned within the first reservoir along the opening in the skiving direction of rotation of the toner transfer meter roller for sealing a gap between the opening and the length of the toner transfer meter roller, the skiving seal comprising:
   a flexible sheet having a first adhesive-coated area at the edge of a first side of the flexible sheet, a second adhesive-coated area on a second side of the flexible sheet and a length corresponding to the length of the gap; and
   a tubular portion adjacent to the gap formed by folding the first side of the flexible sheet over itself from the edge extending along the length of the flexible sheet without creasing the fold and adhesively adhering the first adhesive-coated area to a surface of the first side of the flexible sheet, the skiving seal being adhered to a surface of the first reservoir adjacent to the gap by the second adhesive-coated area.

15. The toner container system for an image forming apparatus of claim 14, wherein the tubular portion has a cross section selected from the group consisting of circular, elliptical and tear drop shaped.

16. The toner container system for an image forming apparatus of claim 14, wherein the skiving seal has a moment of inertia sufficient to prevent buckling of the tubular portion so that the tubular portion is not carried into the gap by the toner transfer meter roller as the toner transfer meter roller rotates past the skiving seal.

17. The toner container system for an image forming apparatus of claim 14, wherein the toner transfer meter roller includes at least one recess for transferring toner and the skiving seal levels toner within the at least one recess as the toner transfer meter roller rotates past the skiving seal.

18. The toner container system for an image forming apparatus of claim 14, wherein a cross-sectional width of the tubular portion is greater than a width of the gap.

* * * * *